March 20, 1956 R. M. GRAY 2,738,635
GRASS CUTTER AND BLOWER
Filed Aug. 3, 1953 5 Sheets-Sheet 1
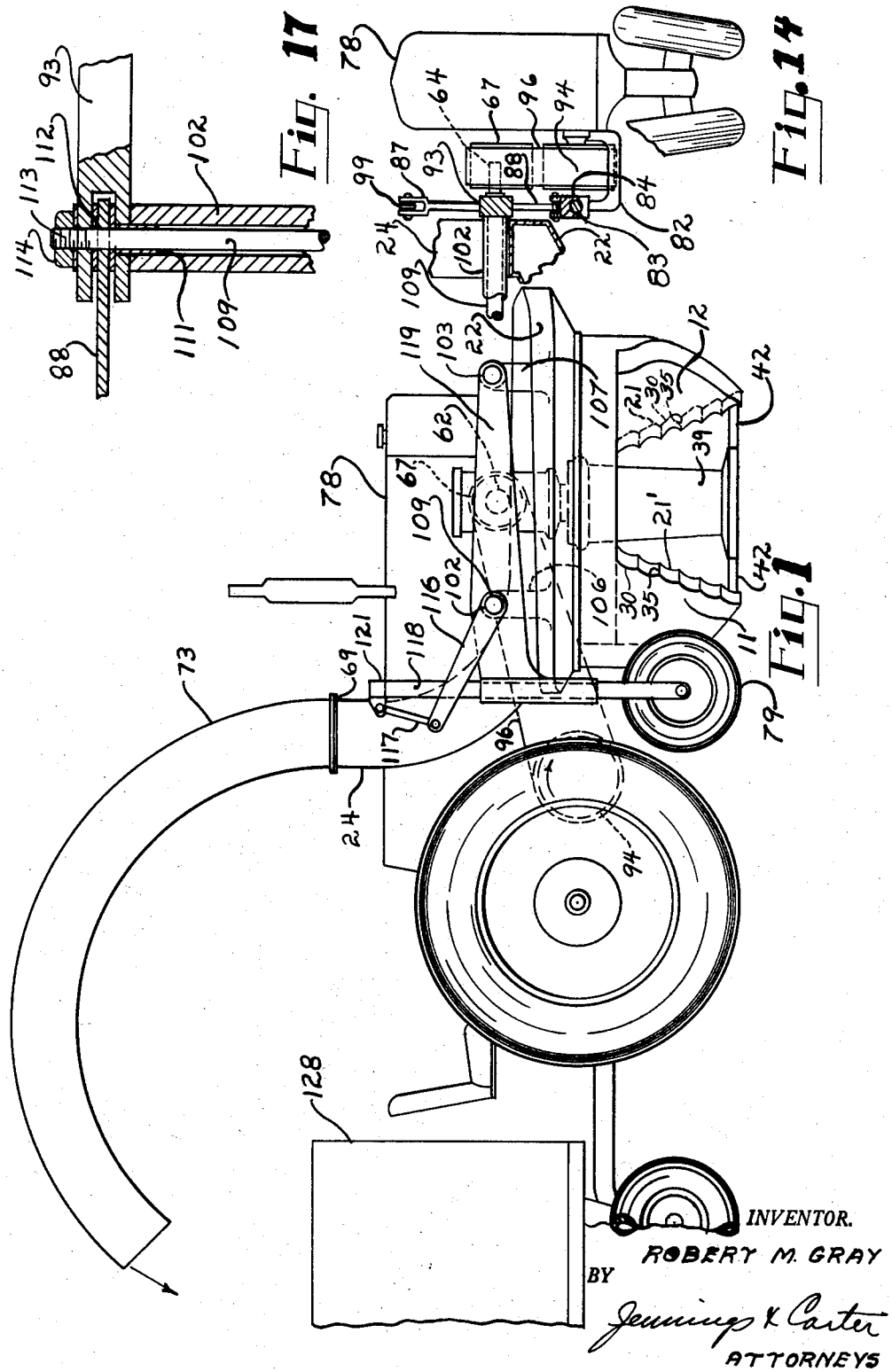
INVENTOR.
ROBERT M. GRAY
BY
Jennings & Carter
ATTORNEYS

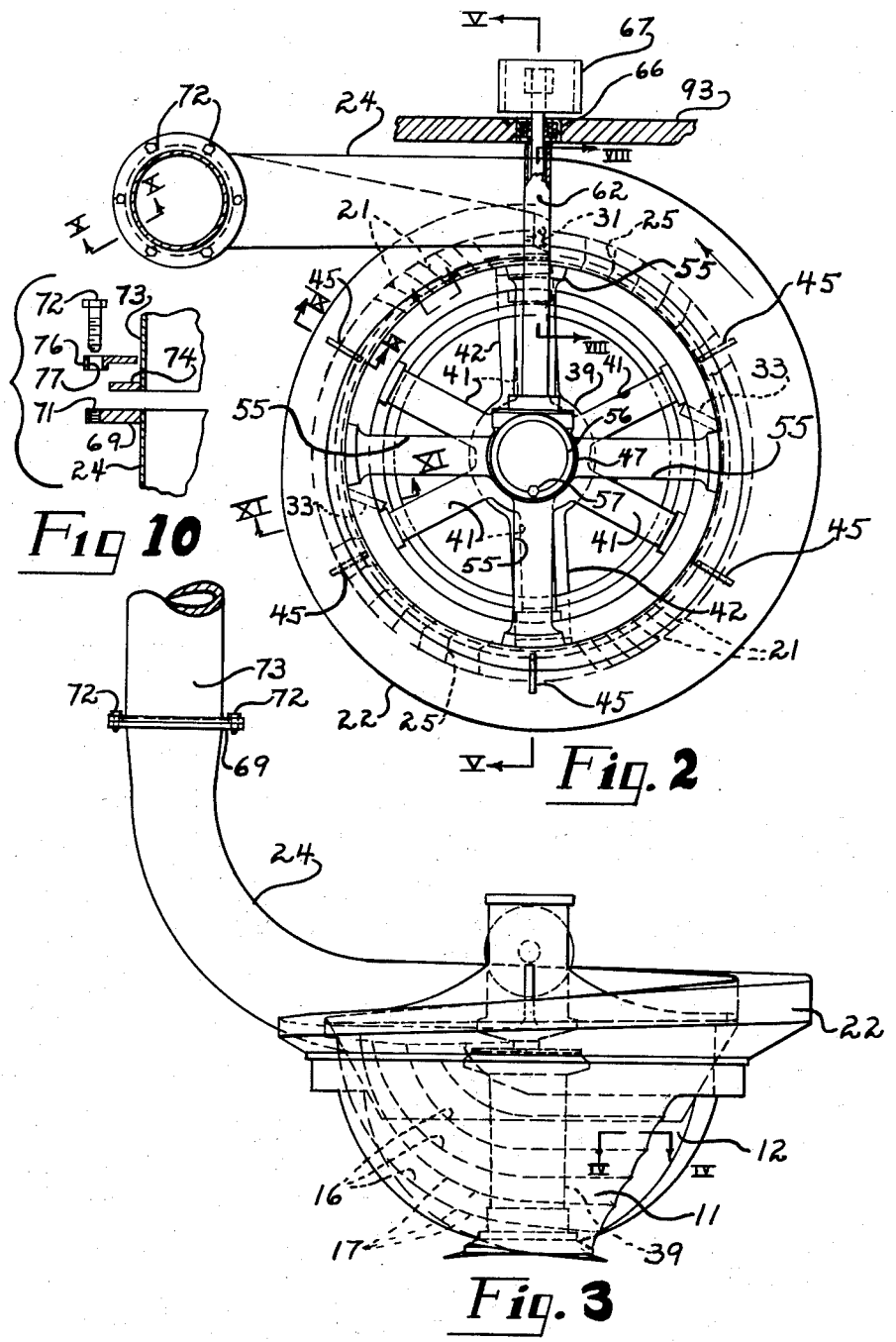

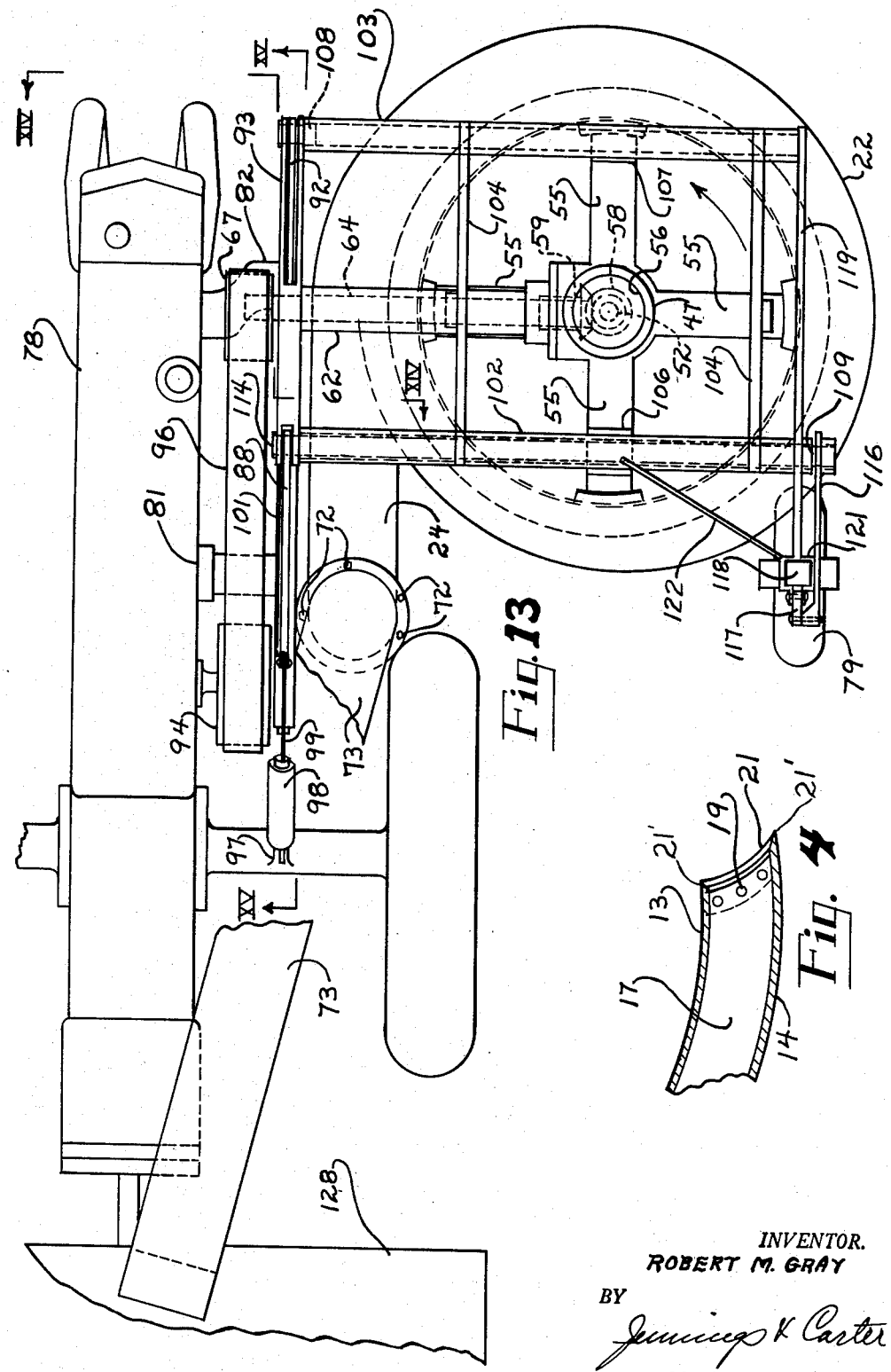

March 20, 1956  R. M. GRAY  2,738,635
GRASS CUTTER AND BLOWER
Filed Aug. 3, 1953  5 Sheets-Sheet 4
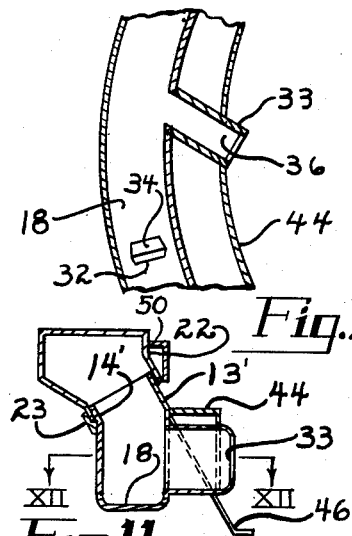
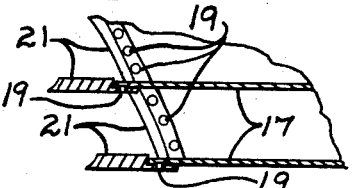
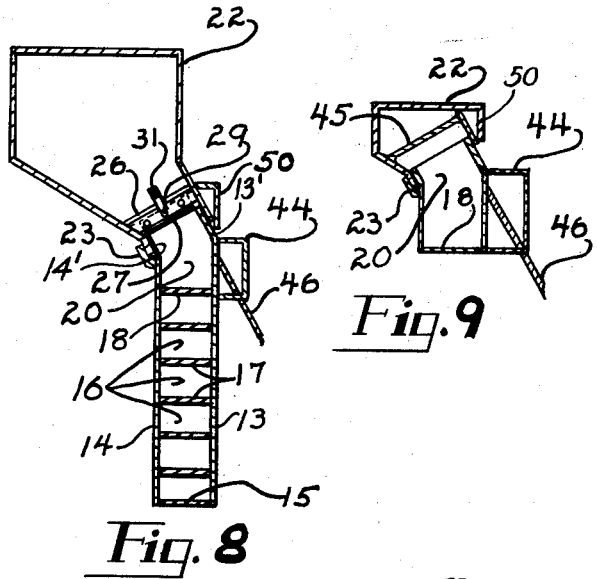
INVENTOR.
ROBERT M. GRAY
BY
Jennings & Carter
ATTORNEYS

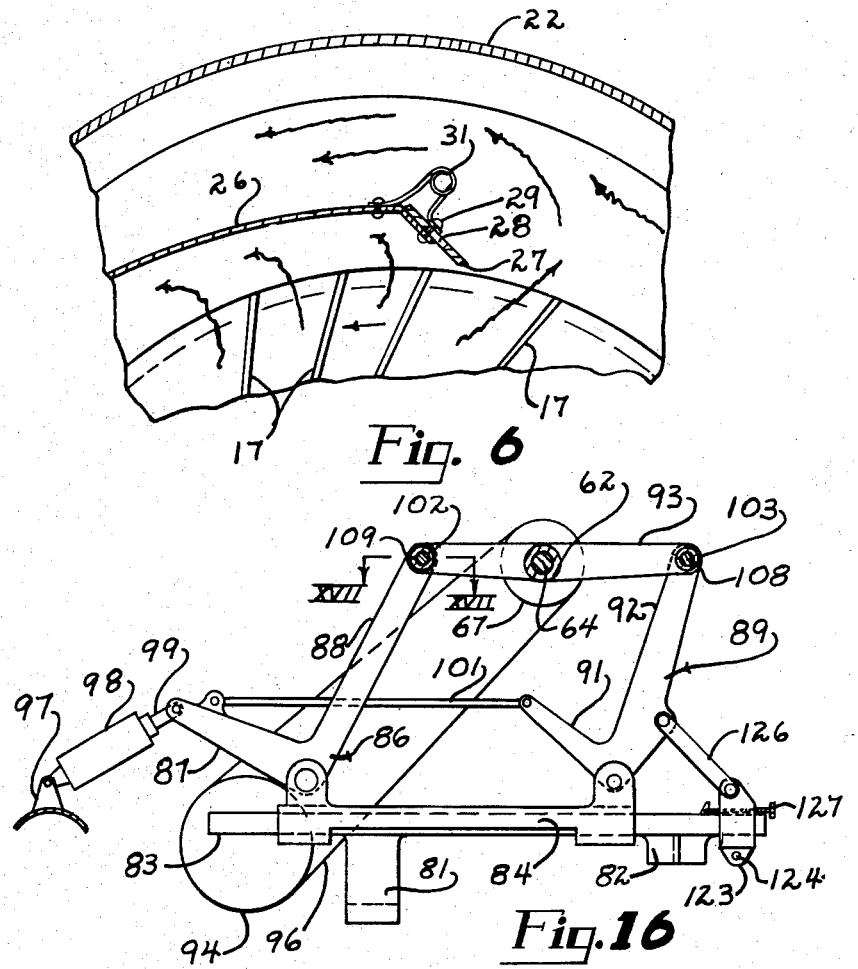

United States Patent Office

2,738,635
Patented Mar. 20, 1956

2,738,635

GRASS CUTTER AND BLOWER

Robert M. Gray, Sheffield, Ala.

Application August 3, 1953, Serial No. 372,036

21 Claims. (Cl. 56—23)

This invention relates to a grass cutter and blower and more particularly to apparatus for cutting silage and the like and conveying the same into a suitable carrier as the apparatus moves along.

A primary object of my invention is to provide apparatus for cutting silage and the like into short lengths and conveying the same immediately to an accompanying carrier whereby the cut grass does not come in contact with the ground, thus assuring that all of the short lengths of grass are harvested and kept in a relatively clean condition.

A more specific object of my invention is to provide a grass cutter and blower which shall embody deep rotary scoop members having cutting edges at the open ends thereof, together with improved means for conveying the cut grass to an accompanying carrier.

A further object of my invention is to provide a grass cutter and blower of the character designated which shall be adapted for easy attachment to conventional types of tractors.

A still further object of my invention is to provide a grass cutter and blower of the character designated which shall be simple of construction, economical of manufacture and one which is particulary adapted for cutting tall grass into short lengths for silage.

As is well known in the art to which my invention relates, difficulties have been encountered in the cutting of grass into short lengths for silage at the time the same is harvested due to the fact that the short lengths fall to the ground and a substantial amount of grass is wasted during the raking process. To overcome these and other difficulties, I have devised a combined rotary cutter and blower which cuts each blade of grass in its path into a plurality of short lengths and then conveys the same immediately to a suitable carrier.

Apparatus embodying features of my invention is illustrated in the accompanying drawings forming a part of this application, in which:

Fig. 1 is a side elevational view, partly broken away and in section showing the apparatus mounted on a tractor;

Fig. 2 is an enlarged plan view with parts broken away and in section of the grass cutter and blower removed from its supporting framework;

Fig. 3 is a side elevational view with parts broken away and in section of the apparatus shown in Fig. 2;

Fig. 4 is an enlarged sectional view taken along the line IV—IV of Fig. 3;

Fig. 5 is an enlarged sectional view taken along the line V—V of Fig. 2;

Fig. 6 is an enlarged sectional view taken along the line VI—VI of Fig. 5;

Fig. 7 is an enlarged sectional view taken along the line VII—VII of Fig. 5;

Fig. 8 is an enlarged sectional view taken along the line VIII—VIII of Fig. 2;

Fig. 9 is an enlarged sectional view taken along the line IX—IX of Fig. 2, certain parts being omitted for the sake of clarity;

Fig. 10 is an enlarged sectional view taken along the line X—X of Fig. 2;

Fig. 11 is an enlarged sectional view taken along the line XI—XI of Fig. 2, certain parts being omitted for the sake of clarity;

Fig. 12 is a sectional view taken generally along the line XII—XII of Fig. 11;

Fig. 13 is a plan view with parts broken away, showing the manner in which the cutter and blower apparatus is mounted on a tractor;

Fig. 14 is a sectional view taken along the line XIV—XIV of Fig. 13, partly broken away and in section;

Fig. 15 is a sectional view drawn on a smaller scale taken along the line XV—XV of Fig. 13, showing the linkage, for raising and lowering the cutter and blower assembly, in the down position and drawn to a slightly smaller scale;

Fig. 16 is a view corresponding to Fig. 15 showing the linkage, for raising and lowering the cutter and blower assembly, in the raised position;

Fig. 17 is an enlarged detail sectional view taken along the line XVII—XVII of Fig. 16.

Referring now to the drawings for a better understanding of my invention I show a combined cutter and blower assembly A mounted for rotation about a stationary vertical axle 10. The cutter and blower assembly comprises a pair of deep scoop members 11 and 12 which are open in the direction of rotation thereof. The scoop members 11 and 12 are curved as viewed in plan and have inner and outer side walls 13 and 14 respectively and a bottom wall 15. Each of the scoop members is divided into a plurality of compartments, passageways or conduits 16 by vertically spaced partition walls or vanes 17 to define closed conduits extending upwardly and rearwardly relative to the direction of rotation of the blower assembly. The side walls 13 and 14 extend upwardly above the scoop members 11 and 12 and are turned outwardly at the top thereof as at 13' and 14' respectively. The cutter and blower assembly is provided with an annular horizontal wall 18 intermediate the top thereof and the uppermost vane 17 which forms with the side walls 13 and 14 a relatively shallow annular trough 20 that is substantially U-shaped as viewed in transverse cross section.

As shown in Fig. 3, the bottom wall 15 and the vanes 17 slope upwardly toward the rear thereof and the compartments 16 communicate with the annular trough 20 through suitable openings or passageways 25 in the wall 18. Mounted on the leading edges 30 of the side wall 14 intermediate the vanes 17, are vertical cutting blades 21'. Mounted on the leading edges 35 of the bottom wall 15 and the vanes 17, by any suitable means such as rivets 19, are removable horizontal cutting blades 21. As shown in Figs. 4 and 7, one edge of each of the cutting blades 21 leads the other edge thereof so that the revolving blade engages the grass with a slicing action, thus facilitating the cutting of the grass. By providing such curved edges on the blades 21, the outer edges of the cutting blades on the bottom wall 15 and the vanes 17 lead the inner edges thereof and the wall 14 of the cutter and blower assembly leads the inner wall 13 thereof, thus causing a maximum amount of air to be scooped in for conveying the grass upwardly through the compartments into the annular trough 20. The upper ends of the cutting blades 21' on the vertical side wall 14 lead the lower ends thereof as shown in Fig. 7. The vertically extending blades 21' cut the grass which does not lie in a vertical plane, thus assuring that all of the grass is cut into short lengths. While the vertical cutting blades 21' may be mounted only on the outer vertical wall 14, it will be apparent that they could be mounted on the inner wall 13 or on both walls 13 and 14.

As shown in Figs. 1, 3 and 7, each cutting blade 21 and 21' extends outwardly of the cutting blade subjacent it so that as the successive cutting edges engage a blade of grass, it is cut into short lengths from its top down, the length of each piece of grass being equal approximately to the vertical distance between the blades 21.

Surrounding the upper end of the cutter and blower assembly and communicating with the annular trough 20 is an involute shaped housing 22. A suitable gasket type seal 23 is provided between the housing 22 and the upper surface of the cutter and blower assembly. The housing 22 terminates in an upwardly extending discharge duct 24. Mounted within the housing 22 is an involute shaped partition member 26 having a blade 27 at the leading edge thereof which forms a divider between the incoming and outgoing air. (See Fig. 6.) The blade 27 is provided with an elongated slot 28 therein and is held in place by any suitable means such as rivets 29 and a spring member 31 which permit the blade 27 to retract in the event pieces of wood, bolts and the like should lodge between the same and the upper ends of the vanes 17.

The upper edges of the vanes 17 are pitched so as to direct the cut grass and the air upward and outward into the involute shaped housing 22. This movement of the grass and air together with the outwardly extending upper portion on the trough 20 increases the air pressure within the housing 22 and creates a partial vacuum within the compartments 16, thus assisting further in the transfer of the cut grass.

Additional air is supplied by providing vents 32 and 33 in the bottom and side walls respectively of the annular trough member 20. The vents 32 are formed by slitting the bottom wall 18 of the trough 20 between the scoop elements 11 and 12 and then pressing the metal downwardly as at 34. The vents 33 comprise conduits which extend inwardly and forwardly of the innermost side wall of the trough 20 in the direction of rotation of the cutter and blower assembly. Suitable openings 36 are provided in the side wall of the trough 20 for conveying air thereinto from the vents 33. By introducing supplemental air intermediate the scoop elements 11 and 12, a turbulent condition is maintained therebetween which prevents the settling of cut grass on the annular horizontal wall 18 intermediate the scoop elements.

Mounted for rotation about the vertical axle 10 in suitable bearings 37 and 38 is a spider member 39. The spider member 39 is connected to the upper and lower ends of the scoop elements 11 and 12 by arms 41 and 42 respectively. While I have shown only two scoop elements, it will be apparent that more elements may be employed. The scoop elements are arranged opposite one another when two are used, and in a similarly balanced position if more elements are employed so that the scoop elements and the spider member 39 will have stability and be dynamically balanced.

A suitable annular sealing member 43 is provided at the upper end of the spider member 39 to prevent the entry of foreign materials into the bearing area. To reinforce the cutter and blower assembly, an annular reinforcing member 44 having an inwardly extending annular flange 46 is rigidly secured to the inner wall of the annular trough 20. To reinforce the housing 22 a plurality of spacer members 45 are secured to the inner walls thereof, also, an annular bracket 50 is secured to the inner side of the housing 22. The bracket 50 is rigidly connected to the stationary axle 10 by means of support arms 55.

Formed integrally with the axle housing 10 or secured to the top thereof by any suitable means is a housing member 47. Mounted for rotation within a vertically extending opening in the stationary axle 10 is a shaft 48 having an annular flange 49 at the bottom thereof which is rigidly connected to the bottom of the spider member 39 by means of cap screws 51. The upper end of the shaft 48 is splined to an upper shaft 52 which is mounted for rotation in bearings 53 and 54 in the housing member 47. The upper end of the housing member 47 is threaded internally for receiving an externally threaded cap member 56 which is held against rotation by means of a set screw 57.

Formed integrally with the upper shaft 52 is a bevel gear 58 which is rotated by a bevel gear 59 mounted for rotation in bearings 61. Secured to the housing member 47 is a horizontally extending housing 62. Mounted for rotation in the housing 62 and keyed to the bevel gear 59 by means of a key 63 is a shaft 64. The outer end of shaft 64 is mounted in bearings 66 in the housing 62 and is keyed to a pulley 67 by means of a key 68.

The upper end of the discharge duct 24 is provided with an annular flange 69 having a plurality of openings 71 therethrough for receiving the lower ends of cap screws 72. Mounted for rotation at the upper end of the duct 24 is a spout section 73 having an annular flange 74 at the lower end thereof. Fitting over the flange 74 is a recessed annular flange 76 having openings 77 therein for receiving the cap screws 72. To rotate the spout section 73 to a desired position, the cap screws 72 are loosened, thus permitting free rotation of the spout. The spout section is then moved to the desired position and is clamped in this position by tightening the cap screws 72.

The cutter and blower assembly is supported at one side by a tractor 78 and at the other side by an outrigger wheel 79 through a suitable linkage for raising and lowering the same now to be described.

Mounted at the side of the tractor 78 by means of suitable support brackets 81 and 82 is a bar 83. Mounted for sliding movement on the bar 83 is a slide member 84. Pivotally mounted at the rear end of the slide member 84 is a bell crank 86 having arms 87 and 88. Pivotally mounted adjacent the forward end of the slide member 84 is a bell crank 89 having arms 91 and 92.

Pivotally connecting the upper ends of the arms 88 and 92 is a horizontally extending bar 93 having suitable recesses in the ends thereof for receiving the arms 88 and 92. As shown in Figs. 15 and 16 the outer end of the housing 62 for the shaft 64 is connected to the bar 93 adjacent the center thereof and is supported thereby. The pulley 67 is driven by a drive pulley 94 on the tractor through a belt 96.

Mounted for pivotal movement on the tractor as at 97 is a hydraulic cylinder 98 having a piston rod 99 which is pivotally connected to the free end of the arm 87 of the bell crank 86. To give added strength to the bell crank linkage, a bar 101 pivotally connects the upper ends of the arms 87 and 91.

Secured rigidly to the bar 93 adjacent opposite ends thereof are a pair of laterally extending housing members 102 and 103. Attached to the spiral shaped housing 22 are mounting bars 104 to which the housing members 102 and 103 are rigidly connected. The housing members 102 and 103 are secured to the axle support arms 55 by means of bracket members 106 and 107 respectively. Secured to and extending outwardly of the housing 103 is a short shaft 108 which projects through suitable openings in the arm 92 and bar 93 so as to pivotally connect the same to the housing 103.

As shown in Fig. 17, a shaft 109 is mounted for rotation in the housing 102 in a suitable bushing 111. The shaft 109 extends through the arm 88 and bar 93 and is rigidly attached to the arm 88 by any suitable means such as by welding at 112. The end of the shaft 109 passing through the bar 93 is threaded as at 113 for receiving a nut 114.

The end of shaft 109 opposite the bar 93 is secured rigidly to an operating arm 116 for the outrigger wheel 79. The free end of the arm 116 is pivotally connected to a link 117 which in turn is pivotally connected to the upper end of a substantially square spindle 118 for the outrigger wheel. Extending transversely of the ends of the housings 102 and 103 adjacent the outrigger wheel 79 is a guide connecting bar 119 for the outrigger wheel. As shown in Fig. 13, the guide connecting bar 119 is provided with a substantially square section 121 for receiving the spindle 118.

To compensate for the angular movement of the pulley 67 and thus keep the belt 96 tight, I mount a bracket 123 adjacent the forward end of the bar 83 by means of a bolt 124. Pivotally connecting the bracket to the arm 92 is a link 126 which pulls the lower end of the arm 92 forward when the apparatus is being raised or forces the same rearward when the apparatus is being lowered thus retaining the pulley 67 the desired distance from the drive pulley 94. The tightness of the belt is regulated by means of a suitable adjusting screw 127 which is in threaded engagement with the bracket 123 and is held against axial movement relative to bar 83. To adjust the tightness of the belt 96, the bolt 124 is loosened and the bracket 123 is moved along the bar 83 by means of the adjusting screw thus moving the pulley 67 toward or from the pulley 94. The bolt 124 is then tightened to clamp the bracket 123 in the desired position.

A suitable carrier 128, such as a trailer, wagon or the like may be attached to the tractor 78, or a motor truck may run alongside the tractor to receive the grass discharged from the spout section 73.

From the foregoing description the operation of my improved grass cutter and blower will be readily understood. The hydraulic cylinder 98 is actuated to rotate the bell cranks 86 and 89 in a clockwise direction thus lowering the housings 102 and 103 and the cutter and blower assembly. As the arm 88, shaft 109 and link 116 move in a clockwise direction, force is exerted upward, thus causing the side of the cutter and blower assembly adjacent the outrigger wheel 79 to be lowered. With the cutter and blower assembly in the down position and rotating in a counterclockwise direction, the blades 21 cut the grass into a series of short lengths due to the fact that the uppermost blade engages the grass before its subjacent blade. As the scoop elements 11 and 12 rotate they draw in the cut grass and air thus forcing the same upwardly between the vanes 17 into the spiral shaped housing 22. The current of air created by the scoop elements blows the cut grass from the housing 22 through the discharge duct 24 and spout section 73 into the carrier 128. To raise the cutter and blower assembly, the hydraulic cylinder 98 is actuated to move the bell cranks 86 and 89 in a counterclockwise direction.

From the foregoing it will be seen that I have devised an improved grass cutter and blower which is adapted to cut the grass into short lengths and convey the same immediately into a carrier without the liability of the same coming in contact with the ground. By providing a combined cutter and blower which operates as a single unit, I have reduced considerably the overall size and cost of manufacture of apparatus for cutting grass and conveying the same into a carrier therefor. Furthermore, by providing a grass cutter and blower which is adapted for attachment to conventional types of tractors, I have reduced further the cost of operating my improved apparatus.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a grass cutter and blower a rotary scoop member embodying a closed conduit extending upwardly and rearwardly relative to the direction of travel thereof and having open uppermost and lowermost ends, a cutting blade at the lowermost end of said conduit constructed and arranged to cut grass in response to rotation of said scoop member and deliver the same into said closed conduit, and a discharge housing communicating with the uppermost end of said conduit.

2. In a combined grass cutter and blower, a plurality of rotary scoop members embodying closed conduits extending upwardly and rearwardly relative to the direction of travel thereof and having open uppermost and lowermost ends, cutting blades at the lowermost ends of said conduits constructed and arranged to cut grass in response to rotation of said scoop members and deliver the same into said conduits, and a discharge housing communicating with the uppermost ends of said conduits.

3. In a combined grass cutter and blower, a plurality of relatively deep rotary scoop members having side walls and upwardly and rearwardly extending bottom walls relative to the direction of travel thereof, a plurality of vanes in said scoop members spaced vertically from each other and defining upwardly and rearwardly extending passageways relative to the direction of travel thereof, cutting blades at the lowermost ends of said passageways constructed and arranged to cut grass in response to rotation of said scoop members and deliver the same into said passageways, and a discharge housing communicating with the uppermost ends of said passageways.

4. A combined grass cutter and blower as defined in claim 3 in which each cutting blade projects forwardly of its subjacent blade relative to the direction of travel thereof whereby the successive cutting blades engage the grass to cut the same into short lengths.

5. A combined grass cutter and blower as defined in claim 3 in which one end of each of the cutting blades leads the other end thereof whereby the blades engage the grass with a slicing action.

6. In a grass cutter and blower, relatively deep rotary scoop members having vertically extending side walls curved as viewed in plan, a plurality of vanes within said scoop members spaced vertically from each other and defining upwardly and rearwardly extending passageways relative to the direction of travel thereof, cutting blades at the leading edges of said vanes relative to the direction of travel thereof, a horizontally extending annular trough mounted at the upper end of said scoop members, there being openings in said trough in communication with said passageways for conveying therethrough the cut grass and air drawn in by the scoop members in response to rotation thereof, a housing mounted above and communicating with said trough, and a discharge duct communicating with said housing.

7. In a grass cutter and blower, relatively deep rotary scoop members curved as viewed in plan and having substantially vertical side walls and upwardly and rearwardly extending bottom walls relative to the direction of travel thereof, a plurality of vanes within said scoop members spaced vertically from each other and extending substantially parallel to said bottom walls to define upwardly and rearwardly extending passageways relative to the direction of travel thereof, removable cutting blades at the leading edges of said bottom walls and vanes and at the leading edges of at least one of said vertical side walls, each of said cutting blades projecting forwardly of its subjacent blade relative to the direction of travel thereof whereby the successive cutting blades engage the grass to cut the same into short lengths, a horizontally extending annular trough secured to the upper end of said scoop members, there being openings in said trough in communication with the uppermost ends of said passageways for conveying therethrough the cut grass and air drawn in by the scoop members in response to rotation thereof, an involute shaped housing mounted above and communicating with said trough, and a discharge duct communicating with said housing.

8. Apparatus as defined in claim 7 in which an annular passageway is provided in the bottom of the housing for receiving with a sliding fit the uppermost portion of the annular trough.

9. In a combined grass cutter and blower, a plurality of relatively deep rotary scoop members curved as viewed in plan and having bottom, inner and outer side walls, a plurality of vanes within said scoop members spaced vertically from each other and defining upwardly and rearwardly extending passageways relative to the direction of travel thereof, cutting blades at the leading edges of said bottom walls, vanes and outer side walls, a horizontally extending annular trough mounted at the upper end of said scoop members, upwardly and outwardly extending edges on said trough, there being openings in the bottom of said trough in communication with said passageways for passing the cut grass and air drawn in by the scoop members, an involute shaped housing having an annular opening in the bottom thereof for receiving with a sliding fit the upwardly and outwardly extending edges of said trough, and a discharge duct communicating with said housing.

10. Apparatus as defined in claim 9 in which the upper ends of the vanes are pitched to direct the cut grass and air upwardly and outwardly into the involute shaped housing.

11. In a grass cutter and blower, a plurality of relatively deep scoop members curved as viewed in plan and having upwardly and rearwardly extending bottom walls relative to the direction of travel thereof and inner and outer side walls, a spider member secured rigidly to said scoop members and mounted for rotation about a stationary axle, a plurality of vanes within said scoop members spaced vertically from each other and defining upwardly and rearwardly extending passageways relative to the direction of travel thereof, cutting blades at the leading edges of said bottom walls, vanes and outer side walls, a horizontally extending annular trough mounted at the upper end of said scoop members, there being passageways in the bottom of said trough in communication with said upwardly and rearwardly extending passageways, means rotating said spider member, a housing mounted above and communicating with said trough, and a discharge duct in communication with said housing.

12. Apparatus as defined in claim 11 in which the stationary axle is connected rigidly to the housing.

13. In a grass cutter and blower, a stationary axle, an involute shaped housing surrounding said axle and connected rigidly thereto, a spider member mounted for rotation about said axle and having a plurality of radially extending arms, means rotating said spider member, scoop members secured to the outer ends of said arms and having inner and outer vertically extending side walls spaced from each other and curved inwardly as viewed in plan, a plurality of vertically spaced vanes in said scoop members defining upwardly and rearwardly extending passageways relative to the direction of travel thereof, cutting blades at the leading edges of said vanes, an annular horizontally extending trough surrounding the upper ends of said scoop members with the upper edges thereof in communication with said housing, there being openings in the bottom of said trough communicating with said passageways, and a discharge duct communicating with said housing.

14. Apparatus as defined in claim 13 in which an annular passageway is provided in the bottom of the housing for receiving with a sliding fit the upper end of the trough and a sealing member is provided at the point of juncture of said housing and trough.

15. Apparatus as defined in claim 13 in which a plurality of vents are provided in the annular trough intermediate the scoop elements for supplying supplemental air.

16. Apparatus as defined in claim 15 in which the vents comprise slitted portions in the bottom of the annular trough with the metal adjacent said slitted portions pressed downwardly.

17. Apparatus as defined in claim 15 in which the vents comprise conduits communicating with the annular trough and extending inwardly and forwardly of the innermost side wall of the trough in the direction of rotation thereof.

18. In a grass cutter and blower, relatively deep rotary scoop members having vertical side walls spaced from each other and curved inwardly as viewed in plan, a plurality of vertically spaced vanes in said scoop members defining upwardly and rearwardly extending passageways relative to the direction of rotation of said scoop members, cutting blades at the leading edges of said vanes, an annular trough surrounding the upper ends of said scoop members and having openings therein in communication with said passageways, an involute shaped housing having an annular opening in the bottom thereof for receiving with a sliding fit the upper end of said trough, an involute shaped partition member in said housing adjacent the uppermost ends of said passageways separating the incoming air and cut grass from the outgoing air and grass in response to rotation of said scoop members, and a discharge duct communicating with said housing.

19. Apparatus as defined in claim 18 in which a blade is mounted on the edge of the partition member which separates the incoming air and grass from the outgoing air and grass and the blade is biased resiliently toward the uppermost end of the passageways.

20. A grass cutter and blower as defined in claim 6 in which vertical cutting blades are mounted on the leading edges of at least one of the side walls.

21. A grass cutter and blower as defined in claim 6 in which vertical cutting blades are mounted on the leading edges of both side walls.

References Cited in the file of this patent

UNITED STATES PATENTS

| | | |
|---|---|---|
| 1,336,257 | Muzzy | Apr. 6, 1920 |
| 1,899,564 | Frey | Feb. 28, 1933 |
| 2,535,122 | Day | Dec. 26, 1950 |
| 2,543,386 | Templeton | Feb. 27, 1951 |
| 2,547,540 | Roberts | Apr. 3, 1951 |
| 2,669,827 | Brownlee | Feb. 23, 1954 |